(No Model.)

N. BAUGHN.
NUT LOCK.

No. 602,715. Patented Apr. 19, 1898.

Witnesses:
H. B. Hallock
S. J. Williamson

Inventor:
Nathan Baughn
By Geo. H. Hogate
Attorney.

UNITED STATES PATENT OFFICE.

NATHAN BAUGHN, OF BUFFINGTON, MISSOURI.

NUT-LOCK.

SPECIFICATION forming part of Letters Patent No. 602,715, dated April 19, 1898.

Application filed July 17, 1897. Serial No. 645,009. (No model.)

*To all whom it may concern:*

Be it known that I, NATHAN BAUGHN, a citizen of the United States, residing at Buffington, in the county of Stoddard and State of Missouri, have invented a certain new and useful Improvement in Nut-Locks, of which the following is a specification.

My invention relates to a new and useful improvement in nut-locks, and has for its object to provide a simple, cheap, and effective device of this description which will firmly hold a nut upon a bolt and prevent an accidental retrograde movement thereof and yet will permit the running off of the nut when desired by the proper manipulation of the lock.

With these ends in view this invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1:
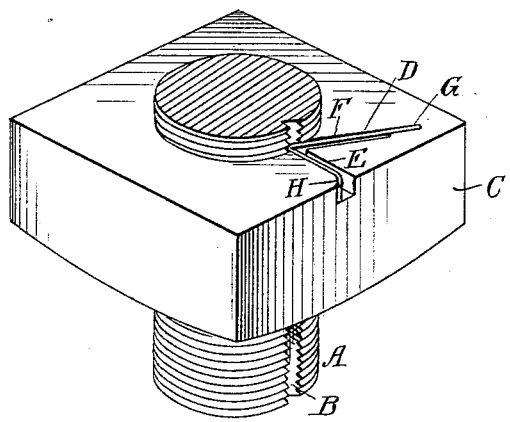
Figure 2:
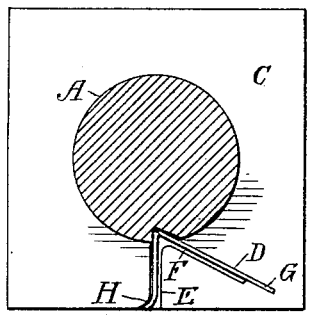
Figure 3:
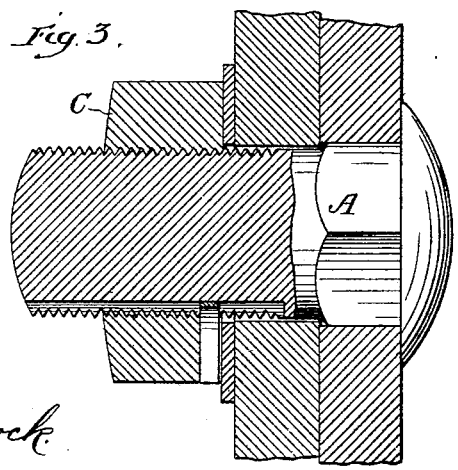

Figure 1 is a perspective of a portion of a bolt, showing a nut having my improvement applied thereto run thereon; Fig. 2, a section of the bolt, showing the locking-spring in place; and Fig. 3, a similar view taken at right angles to Fig. 2.

In carrying out my invention as here embodied, A represents the bolt, having a V-shaped groove B formed longitudinally therein, and C is the nut, having two slots D and E cut therein at an angle to each other, and within these grooves is set a V-shaped spring F, which is tightly secured in the slot D by a portion of the walls of the latter being swaged thereon, as indicated at G. The remainder of this slot D is somewhat larger than the thickness of the spring, in order that the spring may have a certain amount of play therein, and this is also true of the slot E for a like object. From this it will be seen that when the nut is run upon the bolt the spring will act as a locking-ratchet by engaging with the V-shaped groove B and prevent a retrograde movement of the nut; but should it be desired at any time to remove the nut this shall be accomplished by forcing the spring outward until its vertex is disengaged from the groove B, after which the nut will be free to revolve in the reversed direction. The forcing outward of the vertex of the spring is facilitated by the hooked end H thereof, with which a suitable implement is engaged for bringing about this result, as will be readily understood.

Any number of grooves may be formed in the bolt, so as to provide for the locking of the nut at various points, and I therefore do not wish to limit myself to the exact number of such grooves.

The cost of manufacturing a nut-lock in accordance with my improvement is but little in advance of the cost of manufacture of an ordinary bolt and nut, since the only part added is the locking-spring.

My improvement is especially adapted for use upon railway-joints and such like places where a constant and violent vibration takes place which has a tendency to cause the nut to work backward; but it is likewise adapted for use in connection with all classes of machinery.

Having thus fully described my invention, what I claim as new and useful is—

1. In combination, a nut having two slots formed in one face thereof, one of said slots running radially from the middle of one side, the other extending diagonally joining the first-named slot at its junction with the central opening, a V-shaped spring arranged in the slots, with one arm fitting in the diagonal slot a portion of the walls of which are swaged, the remainder of the slot being of greater width than the spring, the other arm fitting in the radial slot and curved at its end, and a bolt having a V-shaped longitudinal groove formed therein, one wall of said slot being in a plane which extends through the longitudinal axis of the bolt, as and for the purpose described.

2. In combination with a bolt having a longitudinal V-shaped groove therein, one wall of which is in a plane which runs through the longitudinal axis of the bolt, a V-shaped spring having the end of one of its arms hooked, and a nut having a radial slot formed in one face thereof extending from the middle of one side, and a diagonal slot joining the first-named slot at its junction with the central opening, said slots being of greater width than the spring said spring being arranged in the slots with the V portion thereof projecting into the central opening of the nut into engagement with the bolt, the arm in the diagonal slot being secured at its outer end to the nut, said arm fitting against the wall of the slot on the outside and a space formed between the arm and the wall of the slot on the inside, and a space formed on either side of the arm in the radial groove, whereby when the nut is tightened the spring will have sufficient play to move out of engagement with the groove of the bolt, but a movement to loosen the nut will cause the spring to abut the walls of the slot and enter into firmer engagement with the groove, substantially as set forth.

In testimony whereof I have hereunto affixed my signature in the presence of two subscribing witnesses.

NATHAN BAUGHN.

Witnesses:
JAMES B. CORBIN,
G. G. ELLIS.